US011875929B2

(12) United States Patent
Takatsu

(10) Patent No.: US 11,875,929 B2
(45) Date of Patent: Jan. 16, 2024

(54) COIL COMPONENT AND METHOD OF MANUFACTURING THE SAME

(71) Applicant: Murata Manufacturing Co., Ltd., Kyoto-fu (JP)

(72) Inventor: Keisuke Takatsu, Nagaokakyo (JP)

(73) Assignee: Murata Manufacturing Co., Ltd., Kyoto-fu (JP)

(*) Notice: Subject to any disclaimer, the term of this patent is extended or adjusted under 35 U.S.C. 154(b) by 446 days.

(21) Appl. No.: 17/027,625

(22) Filed: Sep. 21, 2020

(65) Prior Publication Data

US 2021/0098182 A1 Apr. 1, 2021

(30) Foreign Application Priority Data

Sep. 30, 2019 (JP) ................................ 2019-180181

(51) Int. Cl.

| | |
|---|---|
| ***H01F 27/29*** | (2006.01) |
| ***H01F 27/28*** | (2006.01) |
| ***H01F 27/255*** | (2006.01) |
| ***H01F 41/02*** | (2006.01) |
| ***H01F 41/063*** | (2016.01) |
| ***H01F 41/12*** | (2006.01) |
| ***H01F 27/32*** | (2006.01) |

(52) U.S. Cl.

CPC ....... *H01F 27/2823* (2013.01); *H01F 27/255* (2013.01); *H01F 27/29* (2013.01); *H01F 27/327* (2013.01); *H01F 41/0246* (2013.01); *H01F 41/063* (2016.01); *H01F 41/127* (2013.01)

(58) Field of Classification Search

CPC .................................................. H01F 27/2823

USPC .......................................................... 336/192

See application file for complete search history.

(56) References Cited

U.S. PATENT DOCUMENTS

2015/0035634 A1* 2/2015 Nakamura ............ H01F 41/046 336/170
2015/0109088 A1* 4/2015 Kim .................... H01F 17/0013 336/200
2015/0123757 A1* 5/2015 Choi ..................... H01F 41/046 29/609
2016/0172096 A1* 6/2016 Jeong ..................... H05K 1/111 336/200

FOREIGN PATENT DOCUMENTS

| | | | |
|---|---|---|---|
| JP | 2003-272922 | A | 9/2003 |
| JP | 2017-098326 | A | 6/2017 |
| JP | 2019-114775 | A | 7/2019 |
| WO | 2011/118508 | A1 | 9/2011 |
| WO | 2018/235550 | A1 | 12/2018 |

* cited by examiner

*Primary Examiner* — Ronald Hinson

(74) *Attorney, Agent, or Firm* — Studebaker & Brackett PC

(57) ABSTRACT

A coil component including a body having a magnetic portion including a metal magnetic particle and a resin, and a coil conductor embedded in the magnetic portion, and an outer electrode provided on a surface of the body and connected to the coil conductor. The coil conductor is a wound body of a conductive wire covered with an insulating film, and has a first surface and a second surface facing each other in a winding axis direction. Also, on the first surface of the coil conductor, a first resin portion is provided at least either on a surface of the conductive wire or in a gap between adjacent ends of the conductive wire.

8 Claims, 10 Drawing Sheets

COIL COMPONENT AND METHOD OF MANUFACTURING THE SAME

CROSS-REFERENCE TO RELATED APPLICATION

This application claims benefit of priority to Japanese Patent Application No. 2019-180181, filed Sep. 30, 2019, the entire content of which is incorporated herein by reference.

BACKGROUND

Technical Field

The present disclosure relates to a coil component and a method of manufacturing a coil component.

Background Art

A coil component in which a coil conductor is embedded in a magnetic portion has been known. Such a coil component is used, for example, as a power inductor or transformer.

For example, Japanese Patent Application Laid-Open No. 2019-114775 discloses a coil electronic component including a magnetic body in which an internal coil part is embedded, and a metal shielding sheet disposed on at least one of an upper part or a lower part of the magnetic body, in which magnetic permeability of the metal shielding sheet is 100 times or higher than permeability of the magnetic body including magnetic metal powder.

SUMMARY

In the coil electronic component described in Japanese Patent Application Laid-Open No. 2019-114775, the internal coil part is covered with an insulating film, but the magnetic metal powder in the magnetic body may deform or pierce the insulating film that covers the internal coil part when an external pressure is applied to the magnetic body during a manufacturing process or the like. As a result, a short circuit may occur in the internal coil part through the magnetic metal powder.

Accordingly, the present disclosure provides a coil component in which a short circuit in a coil conductor is prevented even when an external pressure is applied to a magnetic portion. Also, the present disclosure to provides a method of manufacturing the coil component.

A coil component of the present disclosure includes a body having a magnetic portion including a metal magnetic particle and a resin, and a coil conductor embedded in the magnetic portion, and an outer electrode provided on a surface of the body and connected to the coil conductor. The coil conductor is a wound body of a conductive wire covered with an insulating film, and has a first surface and a second surface facing each other in a winding axis direction. Also, on the first surface of the coil conductor, a first resin portion is provided at least either on a surface of the conductive wire or in a gap between adjacent ends of the conductive wire.

A method of manufacturing a coil component of the present disclosure includes the steps of manufacturing a body on a surface of which a part of the coil conductor is exposed by embedding a coil conductor that is a wound body of a conductive wire covered with an insulating film and has a first surface and a second surface facing each other in a winding axis direction in a magnetic portion including a metal magnetic particle and a resin, and forming an outer electrode connected to the coil conductor on the surface of the body. In the step of manufacturing a body, a first resin portion is provided at least either on the surface of the conductive wire or in a gap between adjacent ends of the conductive wire on the first surface of the coil conductor before embedding the first surface of the coil conductor in the magnetic portion.

The present disclosure can provide a coil component that prevents a short circuit in a coil conductor even when an external pressure is applied to a magnetic portion. Further, the present disclosure can provide a method of manufacturing the coil component.

DETAILED DESCRIPTION

Hereinafter, a coil component of the present disclosure and a method of manufacturing the coil component of the present disclosure will be described. The present disclosure is not limited to the following configurations, and may be modified as appropriate without departing from the gist of the present disclosure. Further, a combination of a plurality of individual preferable configurations described below is also the present disclosure.

[Coil Component]

Figure 1:
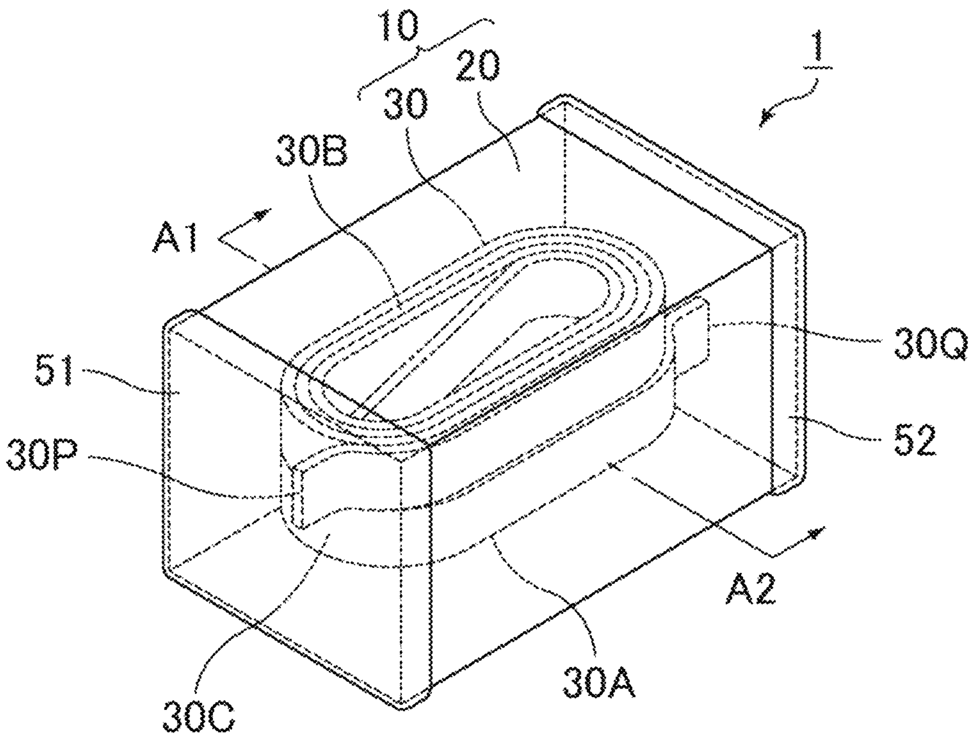
FIG. 1 is a transparent schematic perspective view showing one example of a coil component of the present disclosure.
Figure 2:
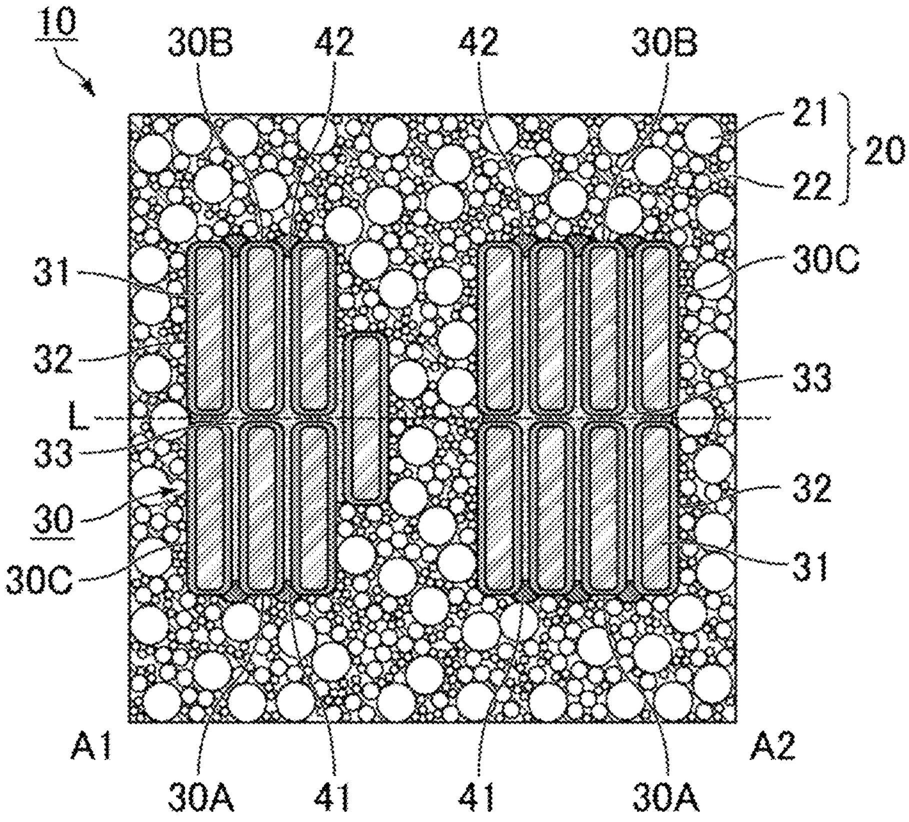
FIG. 2 is a schematic sectional view showing a part corresponding to a line segment A1-A2 in FIG. 1.

FIG. 1 is a schematic perspective view showing one example of the coil component of the present disclosure. FIG. 2 is a schematic sectional view showing a part corresponding to a line segment A1-A2 in FIG. 1.

As shown in FIG. 1, the coil component 1 has a body 10, a first outer electrode 51, and a second outer electrode 52.

The body 10 has a magnetic portion 20 and a coil conductor 30.

As shown in FIG. 2, the magnetic portion 20 includes metal magnetic particles 21 and a resin 22.

Specifically, the metal magnetic particles 21 are dispersed in the resin 22 to form the magnetic portion 20.

Examples of the metal magnetic particles 21 include iron-based soft magnetic portionicles such as α-iron, iron-silicon alloy, iron-silicon-chromium alloy, iron-silicon-aluminum alloy, iron-nickel alloy, and iron-cobalt alloy.

A form of the metal magnetic particles 21 is preferably amorphous having good soft magnetism, but may be crystalline.

A content of the metal magnetic particles 21 in the magnetic portion 20 is preferably 75% by volume or more. When the content of the metal magnetic particles 21 in the magnetic portion 20 is less than 75% by volume, a magnetic property such as magnetic permeability or magnetic flux saturation density may deteriorate in the magnetic portion 20. Further, the content of the metal magnetic particles 21 in the magnetic portion 20 is preferably 90% by volume or less. When the content of the metal magnetic particles 21 in the magnetic portion 20 is more than 90% by volume, a content of the resin 22 decreases. Thus, fluidity of the metal magnetic particles 21 decreases during formation of the magnetic portion 20, and a packing density of the metal magnetic particles 21 in the magnetic portion 20 is unlikely to increase. As a result, the magnetic permeability, inductance, or the like may decrease in the magnetic portion 20.

The content of the metal magnetic particles 21 in the magnetic portion 20 is determined as follows. First, a section of the body 10 is exposed at three parts, and three images in total, one image per section, are captured with a visual field and a magnification set in a range in which the whole section fits. Then, for each image obtained, an occupied area of the metal magnetic particles 21, an occupied area of the resin 22, and an occupied area of the coil conductor 30 are identified using a scanning electron microscope (SEM) and a compositional mapping analyzer such as an energy dispersive X-ray analysis (EDX). Subsequently, for each area identified in each image, an area is calculated by binarization processing using image analysis software or the like. Then, an average value of a ratio of the area of the occupied area of the metal magnetic particles 21 to the total area of each area is obtained. Similarly, an average value of a ratio of an area of the occupied area of the resin 22 to the total area of each area and an average value of a ratio of an area of the occupied area of the coil conductor 30 to the total area of each area are obtained. Then, a volume ratio of the metal magnetic particles 21 when a sum of the respective ratios taken by the power of 3/2 is 100% by volume is determined as the content of the metal magnetic particles 21 in the magnetic portion 20. The binarization processing described above is executed on the basis of a signal intensity ratio of an electron image of the scanning electron microscope and a signal intensity ratio of an identified element of the energy dispersive X-ray analysis. For a threshold of binarization, a distribution with a horizontal axis of the signal intensity ratio and a vertical axis of a frequency of the signal intensity ratio is taken. When a binomial distribution is obtained, the signal intensity ratio between peaks of the binomial distribution is determined as the threshold. When a single distribution is obtained, a half of a peak value of the single distribution is desirably determined as the threshold.

Examples of the resin 22 include epoxy resin, phenol resin, polyester resin, polyimide resin, and polyolefin resin.

The magnetic portion 20 may have a single-layer structure or a multilayer structure. For example, when the magnetic portion 20 has a two-layer structure having a boundary L indicated by a dotted line in FIG. 2, at least either a type of metal magnetic particles 21 or a type of the resin 22 is different between the layers of the magnetic portion 20.

As shown in FIGS. 1 and 2, the coil conductor 30 is embedded in the magnetic portion 20.

The coil conductor 30 is a wound body of a conductive wire 31 covered with an insulating film 32. Specifically, the coil conductor 30 is an air-core coil conductor in which the conductive wire 31 having a rectangular strip shape and covered with the insulating film 32 is wound by α-winding.

Examples of winding of the coil conductor 30 include spiral winding in addition to α-winding.

Examples of a shape of the conductive wire 31 include a round wire shape and a square wire shape in addition to a rectangular strip shape.

A material of the conductive wire 31 is preferably an electrochemically nobler material than iron, and examples thereof include metals such as copper.

Examples of a material of the insulating film 32 include insulating resins such as polyimide resin and polyester resin.

Unless otherwise specified herein, a state in which the conductive wire 31 is covered with the insulating film 32 is simply referred to as the conductive wire 31 to describe a configuration of the coil conductor 30.

The coil conductor 30 has a first surface 30A and a second surface 30B facing each other in a winding axis direction (vertical direction in FIGS. 1 and 2), and a side surface 30C parallel to the winding axis direction. The first surface 30A, the second surface 30B, and the side surface 30C of the coil conductor 30 are defined by an outermost surface of the coil conductor 30.

In the coil conductor 30, as shown in FIG. 2, a thickness of the insulating film 32 is likely to be small at corners and a surface of the conductive wire 31 that configure the first surface 30A and the second surface 30B. Thus, conventionally, when an external pressure is applied to the magnetic portion 20, the metal magnetic particles 21 in the magnetic portion 20 easily deforms or pierces the insulating film 32 at the corners and the surface of the conductive wire 31 where the thickness of the insulating film 32 is likely to be small. On the other hand, in the coil component 1, a first resin portion 41 is provided on the first surface 30A of the coil conductor 30, at least either on the surface of the conductive wire 31 or in a gap between adjacent ends of the conductive wire 31. The first resin portion 41 provided in this way protects at least one of the corners or the surface of the conductive wire 31 where the thickness of the insulating film 32 is likely to be small at the first surface 30A of the coil conductor 30. This prevents the metal magnetic particles 21 in the magnetic portion 20 from deforming or piercing the insulating film 32 on at least one of the corners or the surface of the conductive wire 31 protected by the first resin portion 41 even when an external pressure is applied to the magnetic portion 20. As a result, even when an external pressure is applied to the magnetic portion 20, a short circuit in the coil conductor 30, or here, a short circuit on the first surface 30A of the coil conductor 30 is prevented.

The surface of the conductive wire 31 herein includes the surface of the insulating film 32 that covers the conductive wire 31. When a fusing agent 33 described later is provided on the surface of the insulating film 32, the surface of the conductive wire 31 may include a surface of the fusing agent 33.

In the body 10 shown in FIG. 2, the first resin portion 41 is provided in the gap between the adjacent ends of the conductive wire 31 on the first surface 30A of the coil conductor 30. In the coil conductor 30 shown in FIG. 2, there are a plurality of gaps between the adjacent ends of the conductive wire 31 on the first surface 30A. However, the first resin portion 41 is preferably provided in all the gaps as shown in FIG. 2, and may be provided in some of the gaps.

Figure 3:
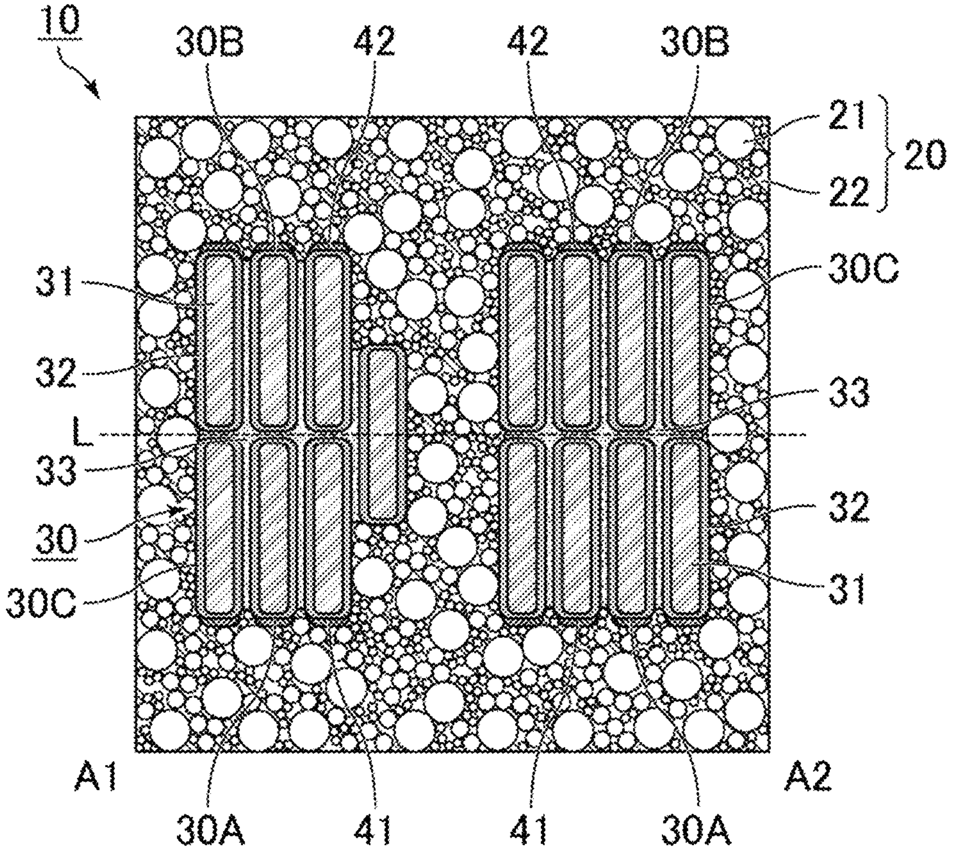
FIG. 3 is a schematic sectional view showing the part corresponding to the line segment A1-A2 in FIG. 1, which is a configuration different from a configuration in FIG. 2.

FIG. 3 is a schematic sectional view showing the part corresponding to the line segment A1-A2 in FIG. 1, which is a configuration different from a configuration in FIG. 2. In the body 10 shown in FIG. 3, the first resin portion 41 is provided on the surfaces of the conductive wire 31 on the first surface 30A of the coil conductor 30. In the coil conductor 30 shown in FIG. 3, there are a plurality of surfaces of the conductive wire 31 on the first surface 30A. However, the first resin portion 41 is preferably provided on all the surfaces of the conductive wire 31 as shown in FIG. 3, and may be provided on some of the surfaces of the conductive wire 31.

Figure 4:
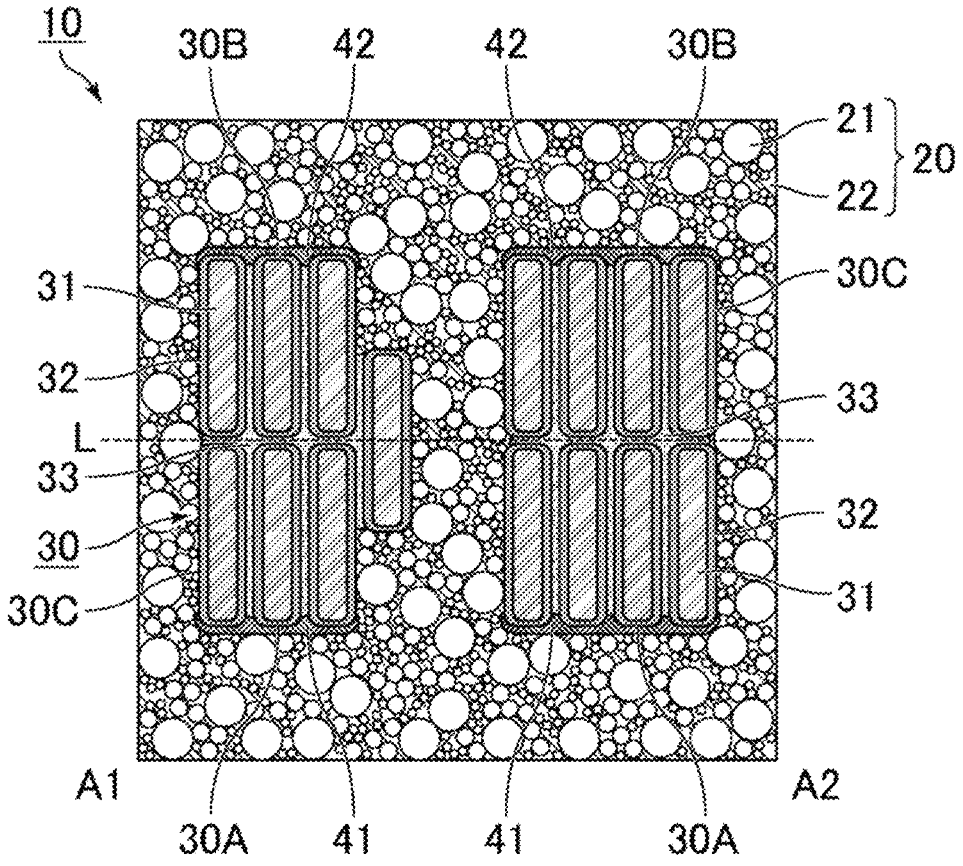
FIG. 4 is a schematic sectional view showing the part corresponding to the line segment A1-A2 in FIG. 1, which is a configuration different from the configurations in FIGS. 2 and 3.

FIG. 4 is a schematic sectional view showing the part corresponding to the line segment A1-A2 in FIG. 1, which is a configuration different from the configurations in FIGS. 2 and 3. In the body 10 shown in FIG. 4, the first resin portion 41 is provided on the surface of the conductive wire 31 and the gap between the adjacent ends of the conductive wire 31 on the first surface 30A of the coil conductor 30. In the coil conductor 30 shown in FIG. 4 there are a plurality of surfaces of the conductive wire 31 and a plurality of the gaps between the adjacent ends of the conductive wire 31 on the first surface 30A. However, the first resin portion 41 is provided on all the surfaces of the conductive wire 31 and in all the gaps as shown in FIG. 4. That is, the first resin portion 41 preferably covers the whole first surface 30A of the coil conductor 30. Further, on the first surface 30A of the coil conductor 30, the first resin portion 41 may be provided on some of the surfaces of the conductive wire 31 and in all the gaps, or may be provided on all the surfaces of the conductive wire 31 and in some of the gaps, or may be provided on some of the surfaces of the conductive wire 31 and in some of the gaps.

Examples of a resin in the first resin portion 41 include epoxy resin, phenol resin, polyester resin, polyimide resin, and polyolefin resin.

A type of the resin 22 in the magnetic portion 20 and a type of the resin in the first resin portion 41 are preferably different from each other. In this case, during a hot press processing as a press processing performed when the coil conductor 30 is embedded in the magnetic portion 20 as described later, a storage elastic modulus of the resin in the first resin portion 41 is preferably higher than a storage elastic modulus of the resin 22 in the magnetic portion 20 at a temperature at which the resin 22 flows. This sufficiently prevents a short circuit in the coil conductor 30, or here, a short circuit on the first surface 30A of the coil conductor 30 even when an external pressure is applied to the magnetic portion 20 during the hot press processing. When the magnetic portion 20 has a two-layer structure having the boundary L indicated by the dotted line in FIG. 2, the type of the resin 22 in each layer of the magnetic portion 20 and the type of the resin in the first resin portion 41 may be different from each other.

The type of each resin configuring the body 10 can be confirmed by exposing the section of the body 10 as shown FIGS. 2, 3, and 4 and then performing element analysis by a transmission electron microscope-energy dispersive X-ray analysis (TEM-EDX).

The type of the resin 22 in the magnetic portion 20 and the type of the resin in the first resin portion 41 may be the same. When the magnetic portion 20 has a two-layer structure having the boundary L indicated by the dotted line in FIG. 2, the type of the resin 22 in one layer of the magnetic portion 20 and the type of the resin in the first resin portion 41 may be the same.

A type of the insulating film 32 and the type of the resin in the first resin portion 41 are preferably different from each other.

As shown in FIGS. 2, 3, and 4, in the coil conductor 30, the conductive wire 31 is preferably wound with the fusing agent 33 in between. The fusing agent 33 is provided in between the adjacent insulating film 32 of the conductive wire 31, and functions as an adhesive for maintaining the winding of the conductive wire 31. The fusing agent 33 may be provided on the surface of the insulating film 32 on the first surface 30A and the second surface 30B of the coil conductor 30.

A type of the fusing agent 33 and the type of the resin in the first resin portion 41 are preferably different from each other. In this case, during a hot press processing as a press processing performed when the coil conductor 30 is embedded in the magnetic portion 20 as described later, a storage elastic modulus of the fusing agent 33 in the first resin portion 41 is preferably higher than a storage elastic modulus of the fusing agent 33 at a temperature at which the resin 22 flows. This sufficiently prevents a short circuit in the coil conductor 30, or here, a short circuit on the first surface 30A of the coil conductor 30 even when an external pressure is applied to the magnetic portion 20 during the hot press processing.

Examples of a material of the fusing agent 33 include a thermoplastic resin whose main component is a polyamide resin or the like.

A second resin portion 42 is preferably provided at least either on the surface of the conductive wire 31 or in a gap between adjacent ends of the conductive wire 31 on the second surface 30B of the coil conductor 30. The second resin portion 42 arranged in this way protects at least one of the corners or the surface of the conductive wire 31 where the thickness of the insulating film 32 is likely to be small on the second surface 30B of the coil conductor 30. This prevents the metal magnetic particles 21 in the magnetic portion 20 from deforming or piercing the insulating film 32 on at least one of the corners or the surface of the conductive wire 31 protected by the second resin portion 42 even when an external pressure is applied to the magnetic portion 20. As a result, even when an external pressure is applied to the magnetic portion 20, a short circuit in the coil conductor 30, or here, a short circuit on the second surface 30B of the coil conductor 30 is prevented.

In the body 10 shown in FIG. 2, the second resin portion 42 is provided in the gap between the adjacent ends of the conductive wire 31 on the second surface 30B of the coil conductor 30. In the coil conductor 30 shown in FIG. 2, there are a plurality of gaps between the adjacent ends of the conductive wire 31 on the second surface 30B. However, the second resin portion 42 is preferably provided in all the gaps as shown in FIG. 2, and may be provided in some of the gaps.

In the body 10 shown in FIG. 3, the second resin portion 42 is provided on the surface of the conductive wire 31 on the second surface 30B of the coil conductor 30. In the coil conductor 30 shown in FIG. 3, there are a plurality of surfaces of the conductive wire 31 on the second surface 30B. However, the second resin portion 42 is preferably provided on all the surfaces of the conductive wire 31 as shown in FIG. 3, and may be provided on some of the surfaces of the conductive wire 31.

In the body 10 shown in FIG. 4, the second resin portion 42 is provided on the surface of the conductive wire 31 and the gap between the adjacent ends of the conductive wire 31 on the second surface 30B of the coil conductor 30. In the coil conductor 30 shown in FIG. 4, there are a plurality of surfaces of the conductive wire 31 and a plurality of the gaps between the adjacent ends of the conductive wire 31 on the second surface 30B. However, the second resin portion 42 is provided on all the surfaces of the conductive wire 31 and in all the gaps as shown in FIG. 4. That is, the second resin portion 42 preferably covers the whole second surface 30B of the coil conductor 30. Further, on the second surface 30B of the coil conductor 30, the second resin portion 42 may be provided on some of the surfaces of the conductive wire 31 and in all the gaps, or may be provided on all the surfaces of the conductive wire 31 and in some of the gaps, or may be provided on some of the surfaces of the conductive wire 31 and in some of the gaps.

Examples of a resin in the second resin portion 42 include epoxy resin, phenol resin, polyester resin, polyimide resin, and polyolefin resin.

A type of the resin 22 in the magnetic portion 20 and the resin in the second resin portion 42 are different from each other. In this case, during a hot press processing as a press processing performed when the coil conductor 30 is embedded in the magnetic portion 20 as described later, a storage elastic modulus of the resin in the second resin portion 42 is preferably higher than a storage elastic modulus of the resin 22 in the magnetic portion 20 at a temperature at which the resin 22 flows. This sufficiently prevents a short circuit in the coil conductor 30, or here, a short circuit on the second surface 30B of the coil conductor 30 even when an external pressure is applied to the magnetic portion 20 during the hot press processing. When the magnetic portion 20 has a two-layer structure having the boundary L indicated by the dotted line in FIG. 2, the type of the resin 22 in each layer of the magnetic portion 20 and the type of the resin in the second resin portion 42 may be different from each other.

The type of the resin 22 in the magnetic portion 20 and the type of the resin in the second resin portion 42 may be the same. When the magnetic portion 20 has a two-layer structure having the boundary L indicated by the dotted line in FIG. 2, the type of the resin 22 in one layer of the magnetic portion 20 and the type of the resin in the second resin portion 42 may be the same.

The type of the insulating film 32 and the type of the resin in the second resin portion 42 are preferably different from each other.

The type of the fusing agent 33 and the type of the resin in the second resin portion 42 are preferably different from each other. In this case, during a hot press processing as a press processing performed when the coil conductor 30 is embedded in the magnetic portion 20 as described later, a storage elastic modulus of the fusing agent 33 in the second resin portion 42 is preferably higher than a storage elastic modulus of the fusing agent 33 at a temperature at which the resin 22 flows. This sufficiently prevents a short circuit in the coil conductor 30, or here, a short circuit on the second surface 30B of the coil conductor 30 even when an external pressure is applied to the magnetic portion 20 during the hot press processing.

The type of the resin in the first resin portion 41 and the type of the resin in the second resin portion 42 may be different from each other or may be the same.

In the body 10 shown in FIGS. 2, 3, and 4, the first resin portion 41 is provided on the first surface 30A of the coil conductor 30, and the second resin portion 42 is provided on the second surface 30B of the coil conductor 30. However, although the first resin portion 41 is provided on the first surface 30A of the coil conductor 30, the second resin portion 42 does not have to be provided on the second surface 30B of the coil conductor 30.

A resin portion such as the first resin portion 41 and the second resin portion 42 is not preferably provided on the side surface 30C of the coil conductor 30. If a resin portion such as the first resin portion 41 and the second resin portion 42 is provided on the side surface 30C of the coil conductor 30, a magnetic property such as magnetic permeability or magnetic flux saturation density may deteriorate in the magnetic portion 20.

As viewed from the winding axis direction of the coil conductor 30, no resin portion such as the first resin portion 41 and the second resin portion 42 is preferably provided inside surfaces located in a center between the first surface 30A and the second surface 30B of the coil conductor 30 and each facing the first surface 30A and the second surface 30B.

The first outer electrode 51 is provided on the surface of the body 10 and is connected to the coil conductor 30. Specifically, the first outer electrode 51 is provided so as to extend to a first end face of the body 10 and a part of each of four faces adjacent to the first end face. Further, the first outer electrode 51 is connected to a first end 30P of the coil conductor 30 exposed on the first end face of the body 10. Specifically, the conductive wire 31 is exposed at the first end 30P of the coil conductor 30, and the exposed part of the conducive wire 31 is connected to the first outer electrode 51.

Examples of a material of the first outer electrode 51 include metals such as copper, nickel, and tin.

The first outer electrode 51 may have a single-layer structure or a multilayer structure. When the first outer electrode 51 has a multilayer structure, the first outer electrode 51 may have a first plating film including copper as a main component, a second plating film including nickel as a main component, and a third plating film including tin as a main component, for example, in that order from the surface of the body 10.

The second outer electrode 52 is provided on the surface of the body 10 and is connected to the coil conductor 30.

Specifically, the second outer electrode 52 is provided so as to extend to a second end face of the body 10 and a part of each of four faces adjacent to the second end face. Further, the second outer electrode 52 is connected to a second end 30Q of the coil conductor 30 exposed on the second end face of the body 10. Specifically, the conductive wire 31 is exposed at the second end 30Q of the coil conductor 30, and the exposed part of the conductive wire 31 and the second outer electrode 52 are connected.

Examples of a material of the second outer electrode 52 include metals such as copper, nickel, and tin.

The second outer electrode 52 may have a single-layer structure or a multilayer structure. When the second outer electrode 52 has a multilayer structure, the second outer electrode 52 may have a first plating film including copper as a main component, a second plating film including nickel as a main component, and a third plating film including tin as a main component, for example, in that order from the surface of the body 10.

A type of the material of the first outer electrode 51 and a type of the material of the second outer electrode 52 may be different, but are preferably the same.

[Method of Manufacturing Coil Component]

The coil component of the present disclosure is manufactured, for example, by the following method.

<Step of Manufacturing Coil Conductor>

Figure 5:
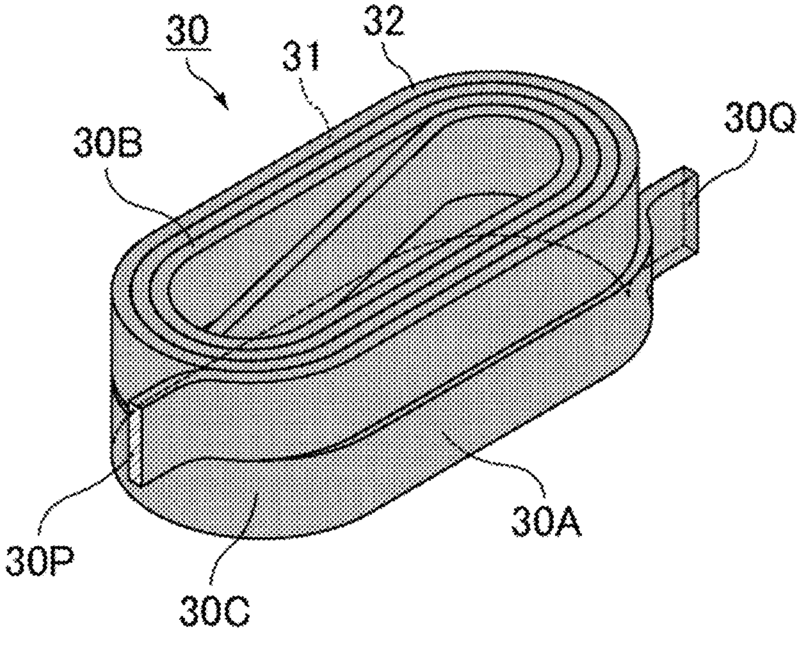
FIG. 5 is a schematic perspective view for explaining one example of a step of manufacturing a coil conductor.

FIG. 5 is a schematic perspective view for explaining one example of a step of manufacturing a coil conductor.

As shown in FIG. 5, a rectangular strip-shaped conductive wire 31 covered with an insulating film 32 is wound by α-winding. As a result, an air core-shaped, so-called α-wound coil conductor 30, which is a wound body of the conductive wire 31 covered with the insulating film 32, is manufactured. When the coil conductor 30 is manufactured, the conductive wire 31 may be wound with a fusing agent in between.

The coil conductor 30 has the first surface 30A and the second surface 30B facing each other in the winding axis direction (vertical direction in FIG. 5), and the side surface 30C parallel to the winding axis direction.

The first end 30P and the second end 30Q of the coil conductor 30 are provided so as to project in directions opposite from the side surface 30C. The conductive wire 31 is exposed at the first end 30P and the second end 30Q of the coil conductor 30.

<Step of Manufacturing Magnetic Sheet>

Figure 6:
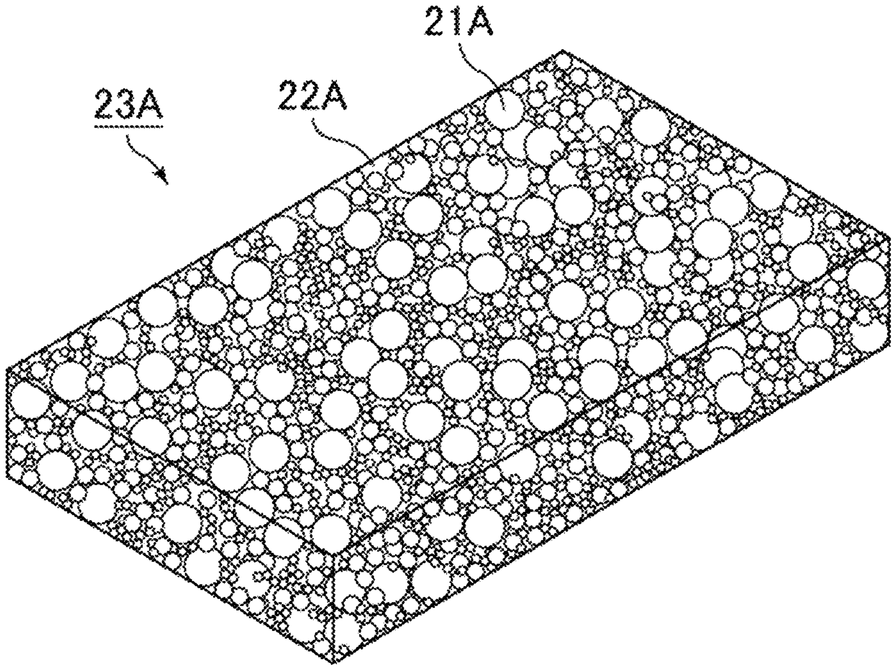
FIG. 6 is a schematic perspective view for explaining one example of a step of manufacturing a magnetic sheet.
Figure 7:
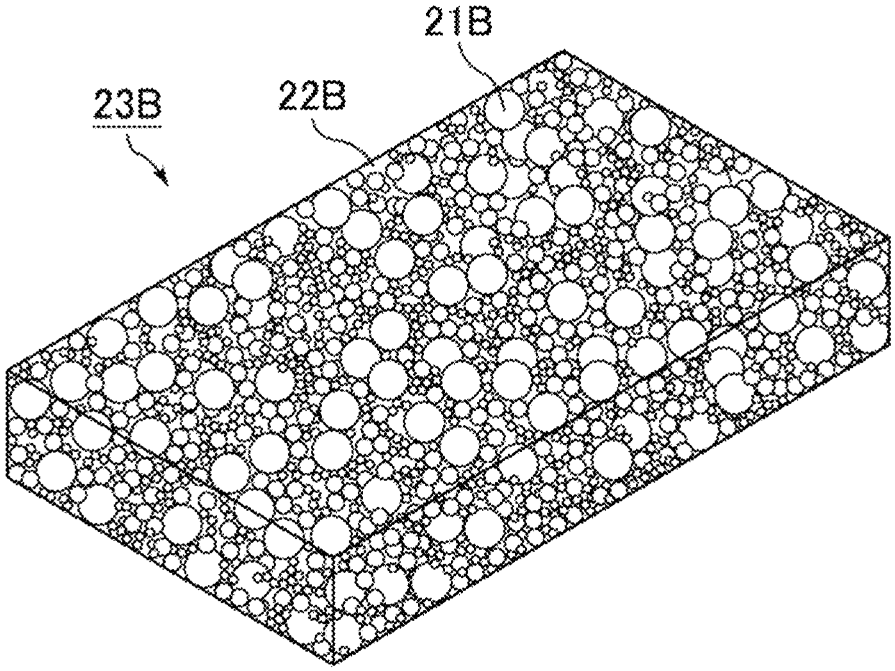
FIG. 7 is a schematic perspective view for explaining one example of the step of manufacturing the magnetic sheet.

FIGS. 6 and 7 are schematic perspective views for explaining one example of a step of manufacturing the magnetic sheet.

First, the metal magnetic particles and a resin are mixed in a wet state to prepare a slurry. Then, the obtained slurry is molded by a doctor blade method or the like and then dried. As a result, a first magnetic sheet 23A is manufactured in which first metal magnetic particles 21A are dispersed in a first resin 22A as shown in FIG. 6. Similarly, as shown in FIG. 7, a second magnetic sheet 23B is manufactured in which second metal magnetic particles 21B are dispersed in a second resin 22B.

A thickness of the first magnetic sheet 23A and a thickness of the second magnetic sheet 23B are, for example, 100 μm or more and 300 μm or less (i.e., from 100 μm to 300 μm).

As the first metal magnetic particles 21A, a plurality of types of metal magnetic particles having different average particle sizes $D_{50}$ may be used in combination. This helps improve filling efficiency of the first metal magnetic particles 21A in the magnetic portion 20 described later, and consequently helps obtain high inductance. Examples of a combination of such metal magnetic particles include a combination of metal magnetic particles having a smaller average particle size $D_{50}$ of 1 μm or more and 20 μm or less (i.e., from 1 μm to 20 μm) and a larger average particle size $D_{50}$ of 10 μm or more and 40 μm or less (i.e., from 10 μm to 40 μm).

As the second metal magnetic particles 21B, a plurality of types of metal magnetic particles having different average particle sizes $D_{50}$ may be used in combination. This helps improve filling efficiency of the second metal magnetic particles 21B in the magnetic portion 20 described later, and consequently helps obtain high inductance. Examples of a combination of such metal magnetic particles include a combination of metal magnetic particles having a smaller average particle size $D_{50}$ of 1 μm or more and 20 μm or less (i.e., from 1 μm to 20 μm) and a larger average particle size $D_{50}$ of 10 μm or more and 40 μm or less (i.e., from 10 μm to 40 μm).

A particle size distribution of the metal magnetic particles is measured by a laser diffraction and scattering method and expressed by an integrated % with respect to a particle size scale. The average particle size $D_{50}$ of the metal magnetic particles is determined as a particle size having an integrated value of 50%.

A content of the first metal magnetic particles 21A in the first magnetic sheet 23A is preferably 96% by weight or more. When the content of the first metal magnetic particles 21A in the first magnetic sheet 23A in the magnetic portion 20 is less than 96% by weight, a magnetic property such as magnetic permeability or magnetic flux saturation density may deteriorate in the magnetic portion 20 described later. Further, a content of the first metal magnetic particles 21A in the first magnetic sheet 23A is preferably 98% by weight or less. When the content of the first metal magnetic particles 21A in the first magnetic sheet 23A is more than 98% by weight, a content of the first resin 22A decreases. Thus, fluidity of the first metal magnetic particles 21A decreases during formation of the magnetic portion 20 described later, and a packing density of the first metal magnetic particles 21A in the magnetic portion 20 described later is unlikely to increase. As a result, the magnetic permeability, inductance, or the like may decrease in the magnetic portion 20 described later.

Similarly, a content of the second metal magnetic particles 21B in the second magnetic sheet 23B is preferably 96% by weight or more. Further, a content of the second metal magnetic particles 21B in the second magnetic sheet 23B is preferably 98% by weight or less.

The type of the first metal magnetic particles 21A and the type of the second metal magnetic particles 21B may be different from each other or may be the same.

The type of the first resin 22A and the type of the second resin 22B may be different from each other or may be the same.

<Step of Manufacturing Body>

FIGS. 8, 9, 10, 11, 12, and 13 are schematic perspective views for explaining one example of a step of manufacturing the body.

Figure 8:
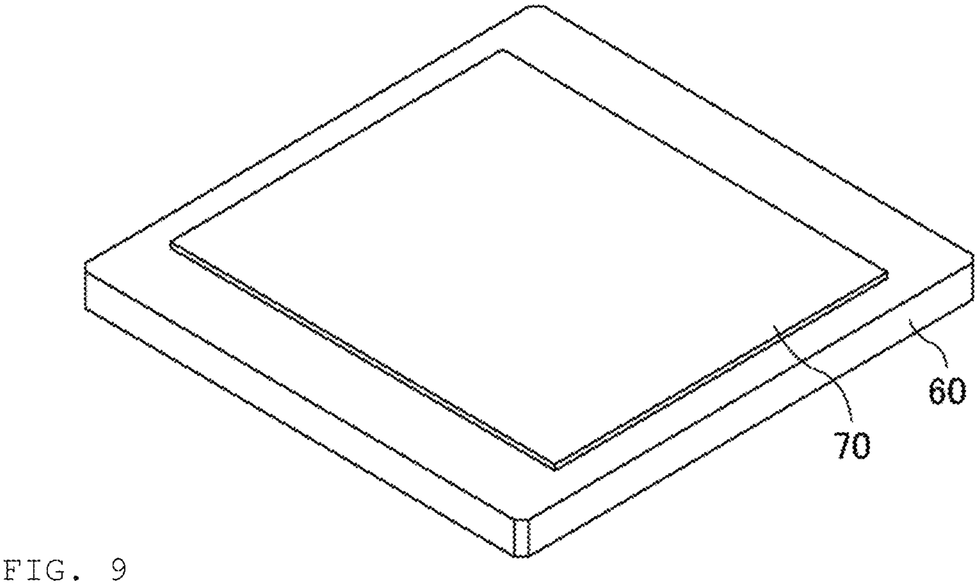
FIG. 8 is a schematic perspective view for explaining one example of a step of manufacturing a body.

First, as shown in FIG. 8, an adhesive sheet 70 is attached to a surface plate 60.

Examples of a material of the surface plate 60 include metal and glass.

Examples of an adhesive of the adhesive sheet 70 include acrylic adhesives, silicone adhesives, natural rubber adhesives, urethane adhesives, and polyolefin adhesives.

Figure 9:
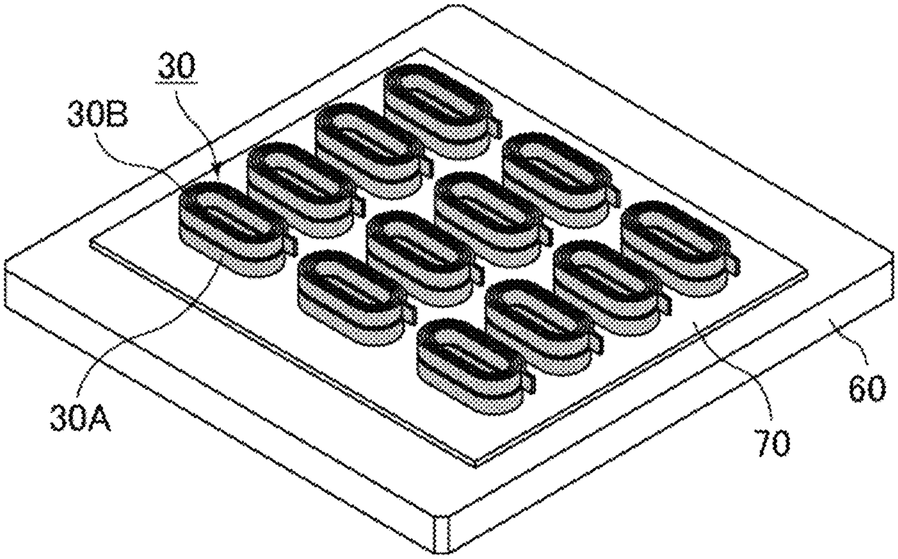
FIG. 9 is a schematic perspective view for explaining one example of the step of manufacturing the body.

Next, as shown in FIG. 9, a plurality of the coil conductors 30 are disposed on a surface of the adhesive sheet 70 such that the first surface 30A of each of the coil conductors 30 and the adhesive sheet 70 are in contact with each other.

At this time, on the second surface 30B of each of the coil conductors 30, a resin may be applied to at least one of the surface of the conductive wire 31 or the gap between the adjacent ends of the conductive wire 31. As a result, the second resin portion 42 having a form exemplified in FIGS. 2, 3, and 4 can be provided before the second surface 30B of the coil conductor 30 is embedded in the magnetic portion 20, specifically, the first magnetic sheet 23A as described later.

Figure 10:
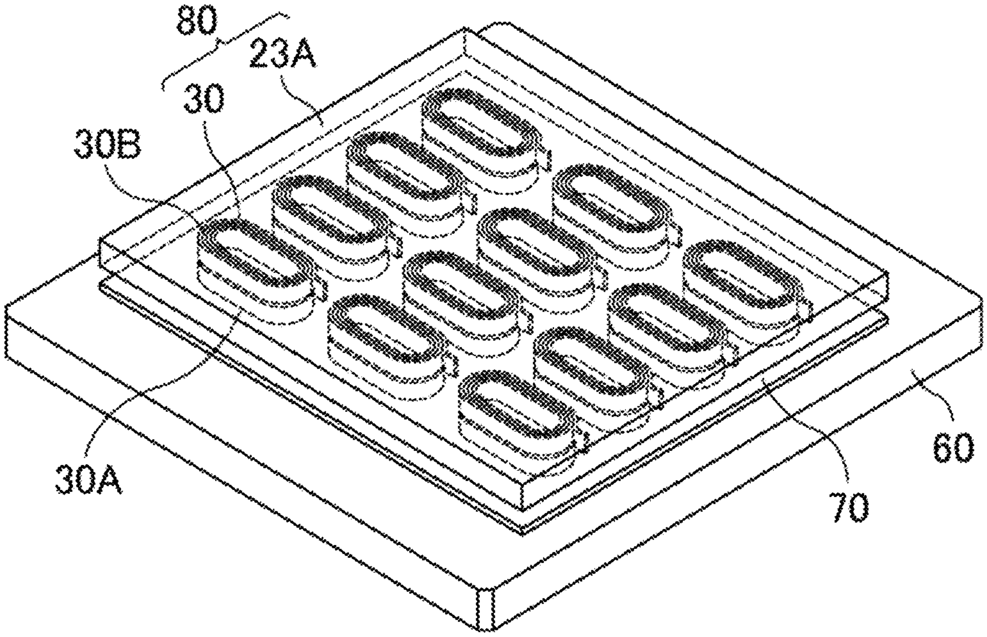
FIG. 10 is a schematic perspective view for explaining one example of the step of manufacturing the body.

Next, as shown in FIG. 10, the first magnetic sheet 23A is placed on the second surface 30B of the coil conductor 30, and the press processing is performed. A processed body 80 is thus manufactured in which a part of the coil conductor 30, which is here, a part including the second surface 30B of the coil conductor 30, is embedded in the first magnetic sheet 23A. When the processed body 80 is manufactured, the coil conductor 30 may be embedded such that only the first surface 30A is exposed from the first magnetic sheet 23A.

Here, when the processed body 80 is manufactured, the adhesive in the adhesive sheet 70 is transferred to at least either the surface of the conductive wire 31 or a gap between the adjacent ends of the conductive wire 31, on the first surface 30A of the coil conductor 30. As a result, the first resin portion 41 having a form exemplified in FIGS. 2, 3, and 4 can be provided before the first surface 30A of the coil conductor 30 is embedded in the magnetic portion 20, specifically, the second magnetic sheet 23B as described later.

When the processed body 80 is manufactured, the hot press processing may be performed as the above press processing.

As a result, the processed body 80 can be manufactured while the first magnetic sheet 23A is solidified to some extent.

A temperature during the hot press processing is preferably a temperature at which the first resin 22A in the first magnetic sheet 23A flows. For example, when the first resin 22A is an epoxy resin, the temperature during the hot press processing is preferably 100° C. or higher.

When the processed body 80 is manufactured, press molding may be performed as the above press processing. That is, when the processed body 80 is manufactured, hot press molding may be performed as the above hot press processing.

Figure 11:
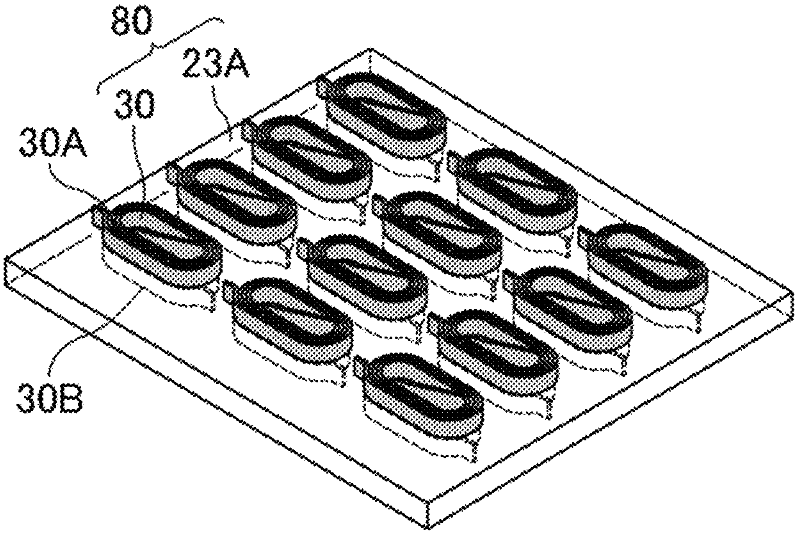
FIG. 11 is a schematic perspective view for explaining one example of the step of manufacturing the body.

Next, the processed body 80 is peeled off from the adhesive sheet 70 and inverted as shown in FIG. 11.

Figure 12:
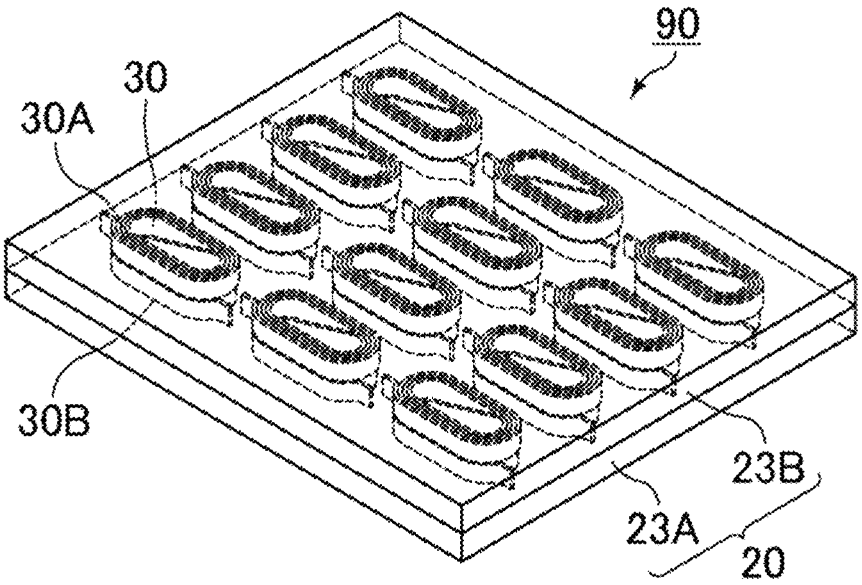
FIG. 12 is a schematic perspective view for explaining one example of the step of manufacturing the body.

Next, as shown in FIG. 12, the second magnetic sheet 23B is placed on the first surface 30A of the coil conductor 30, and the press processing is performed. Thus, a part of the coil conductor 30 that is not embedded in the first magnetic sheet 23A, which is here, a part including the first surface 30A of the coil conductor 30, is embedded in the second magnetic sheet 23B. As a result, an aggregate base body 90 is manufactured in which the whole coil conductor 30 is embedded in the magnetic portion 20 as a laminated body of the first magnetic sheet 23A and the second magnetic sheet 23B.

In the aggregate base body 90 manufactured as described above, the magnetic portion 20 includes the first metal magnetic particles 21A derived from the first magnetic sheet 23A and the second metal magnetic particles 21B derived from the second magnetic sheet 23B. These metal magnetic particles are not particularly distinguished from the metal magnetic particles 21 in the magnetic portion 20 shown in FIGS. 2, 3, and 4. Further, the magnetic portion 20 includes the first resin 22A derived from the first magnetic sheet 23A and the second resin 22B derived from the second magnetic sheet 23B. These resins are not particularly distinguished from the resin 22 in the magnetic portion 20 shown in FIGS. 2, 3, and 4.

When the aggregate base body 90 is manufactured, the hot press processing may be performed as the above press processing. As a result, the aggregate base body 90 can be manufactured while the second magnetic sheet 23B is solidified to some extent. A temperature during the hot press processing is preferably a temperature at which the second resin 22B in the second magnetic sheet 23B flows. For example, when the second resin 22B is an epoxy resin, the temperature during the hot press processing is preferably 100° C. or higher.

When the aggregate base body 90 is manufactured, the press molding may be performed as the above press processing.

That is, when the aggregate base body 90 is manufactured, the hot press molding may be performed as the above hot press processing.

Figure 13:
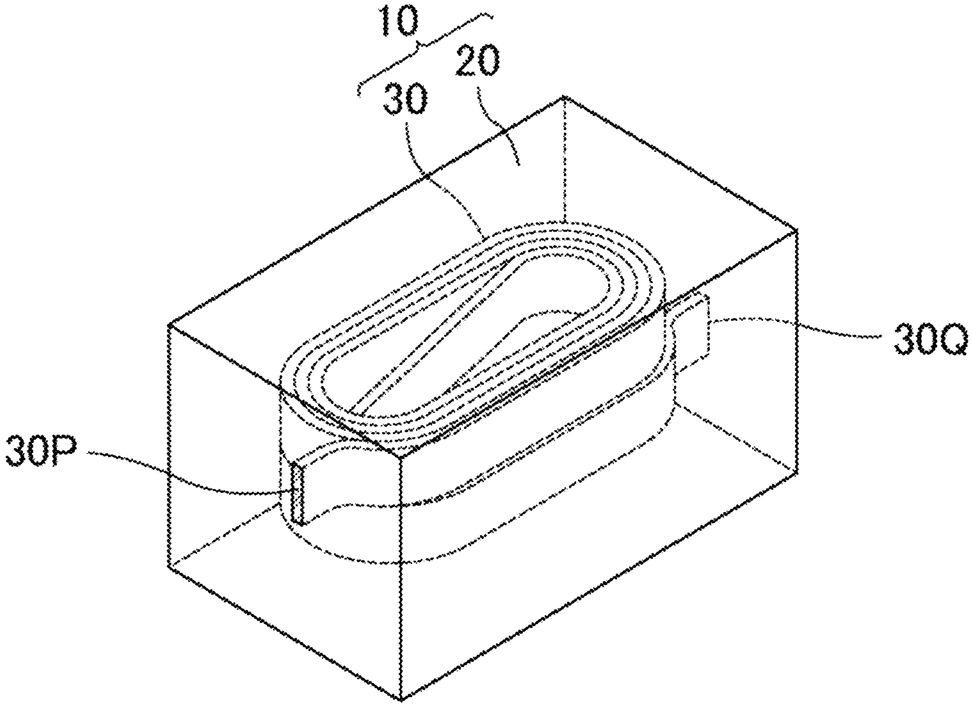
FIG. 13 is a schematic perspective view for explaining one example of the step of manufacturing the body.

Then, the aggregate base body 90 is separated into pieces using a cutting tool such as a dicer. Thus, as shown in FIG. 13, there is manufactured the body 10 on a surface of which a part of the coil conductor 30 is exposed or here, the body 10 in which the first end part 30P of the coil conductor 30 is exposed on the first end face, and the second end 30Q of the coil conductor 30 is exposed on the second end face.

<Step of Forming Outer Electrode>

Figure 14:
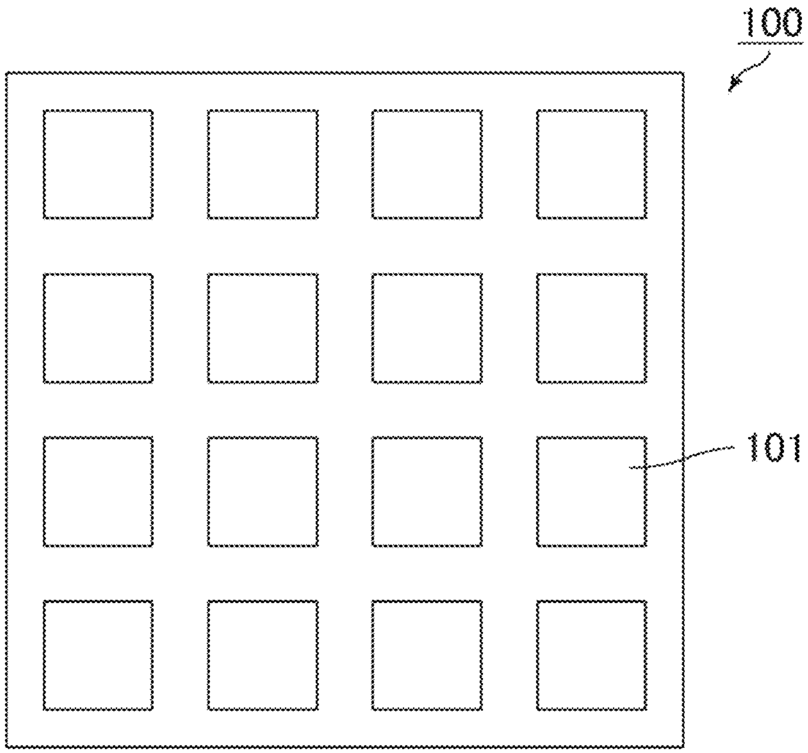
FIG. 14 is a schematic plan view showing a holder for the body used in one example of a step of forming an outer electrode.
Figure 15:
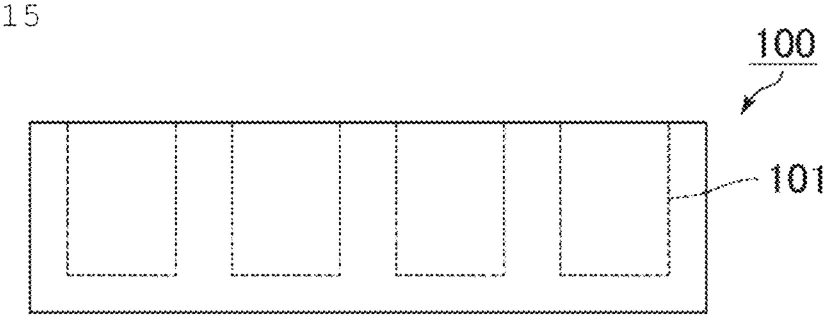
FIG. 15 is a schematic side view of the holder shown in FIG. 14.

FIG. 14 is a schematic plan view showing a holder for the body used in one example of a step of forming an outer electrode. FIG. 15 is a schematic side view of the holder shown in FIG. 14. FIGS. 16, 17, 18, and 19 are schematic side views for explaining one example of the step of forming an outer electrode.

First, as shown in FIGS. 14 and 15, a holder 100 provided with a plurality of holes 101 capable of holding the body 10 is prepared.

Next, the body 10 is barrel-polished in water or in the air to be chamfered. Then, the body 10 is washed.

Figure 16:
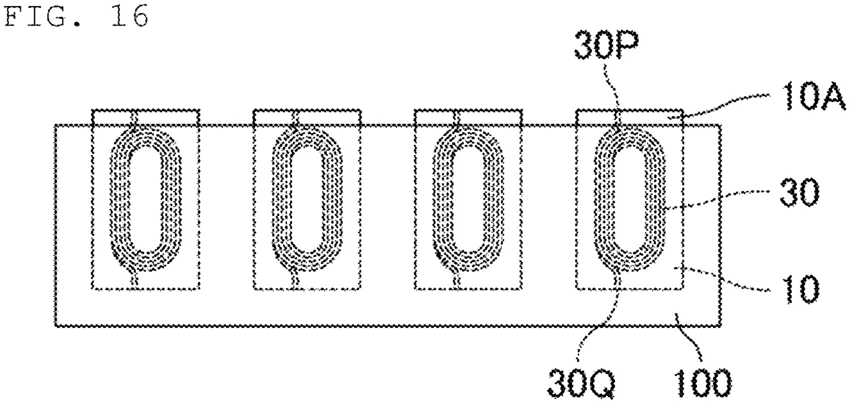
FIG. 16 is a schematic side view for explaining one example of the step of forming the outer electrode.
Figure 17:
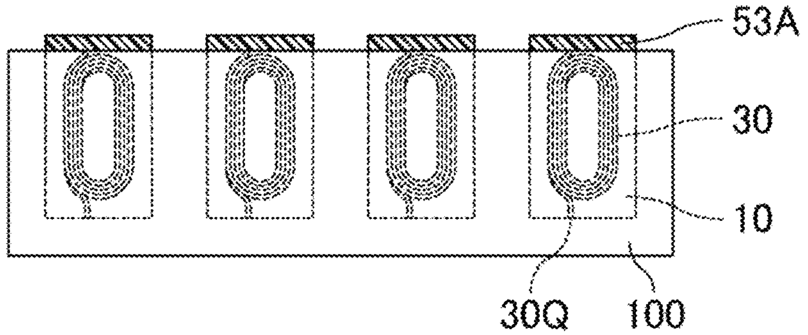
FIG. 17 is a schematic side view for explaining one example of the step of forming the outer electrode.

Next, as shown in FIG. 16, the body 10 is held in each hole 101 of the holder 100 such that a first end 10A of the body 10 projects from the holder 100. Subsequently, by immersing the holder 100 holding the body 10 in a conductive solution, as shown in FIG. 17, a first conductive layer 53A is formed at the first end 10A of the body 10. Here, the first end 30P of the coil conductor 30 is exposed on the surface of the first end 10A of the body 10, and thus the first end 30P of the coil conductor 30 is connected to the first conductive layer 53A.

Figure 18:
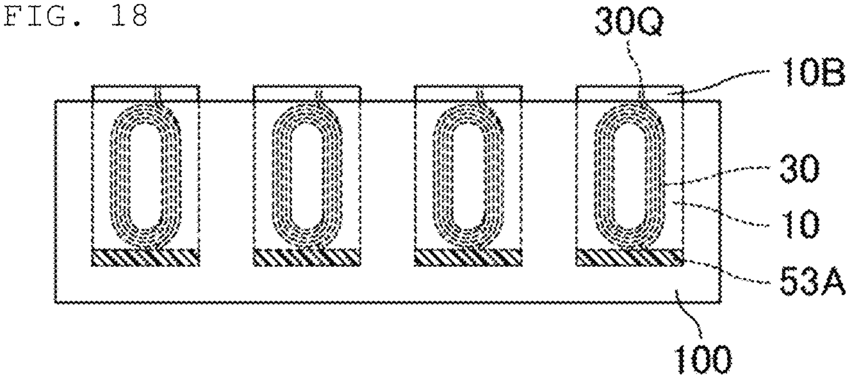
FIG. 18 is a schematic side view for explaining one example of the step of forming the outer electrode.
Figure 19:
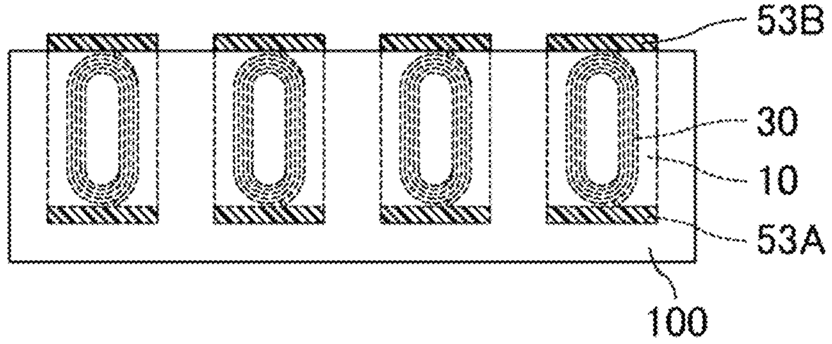
FIG. 19 is a schematic side view for explaining one example of the step of forming the outer electrode.

Next, the body 10 is taken out of the holder 100, and as shown in FIG. 18, the body 10 is held in each hole 101 of the holder 100 such that a second end 10B of the body 10 projects from the holder 100. Subsequently, by immersing the holder 100 holding the body 10 in a conductive solution, as shown in FIG. 19, a second conductive layer 53B is formed at the second end 10B of the body 10. Here, the second end 30Q of the coil conductor 30 is exposed on the surface of the second end 10B of the body 10, and thus the second end 30Q of the coil conductor 30 is connected to the second conductive layer 53B.

A conductive material included in the conductive solution is not particularly limited as long as the conductive material can form a plating film by electrolytic plating described later, and examples of the conductive material include palladium, tin, silver, and alloys thereof.

Next, after the body 10 is taken out of the holder 100, the body 10 is subjected to electrolytic plating, and, for example, the first plating film, the second plating film, and the third plating film are sequentially laminated on surfaces of the first conductive layer 53A and the second conductive layer 53B. Thus, as shown in FIG. 1, the first outer electrode 51 connected to the first end 30P of the coil conductor 30 and the second outer electrode 52 connected to the second end 30Q of the coil conductor 30 are formed on the surface of the body 10.

As described above, the coil component of the present disclosure is manufactured.

As a modified example of the above manufacturing method, a mold having a recess may be used instead of the surface plate 60 without using the adhesive sheet 70 in the step of manufacturing a body. Specifically, as a step corresponding to FIG. 9, a plurality of the coil conductors 30 may be disposed in the recess of a mold such that the first surface 30A of the coil conductor 30 and the mold are in contact with each other. In this case, in a step corresponding to FIG. 11, on the first surface 30A of the coil conductor 30, the first resin portion 41 can be provided by applying resin to at least one of the surface of the conductive wire 31 or the gap between the adjacent ends of the conductive wire 31.

What is claimed is:

1. A coil component comprising:

a body having a magnetic portion including metal magnetic particles and a resin, and a coil conductor embedded in the magnetic portion, the coil conductor being a wound body in which a conductive wire covered with an insulating film is wound, and having a first surface and a second surface facing each other in a winding axis direction, and opposing side surfaces each connecting the first surface to the second surface, and a first resin portion being provided on the first surface of the coil conductor at least either on a surface of the conductive wire or in a gap between adjacent ends of the conductive wire; and an outer electrode provided on a surface of the body and connected to the coil conductor, wherein the insulating layer covers a whole circumference of the conductive wire, and the first resin portion is not provided on an innermost and an outermost of the side surfaces of the coil conductor of the wound body.

2. The coil component according to claim 1, wherein a second resin portion is provided on the second surface of the coil conductor at least either on the surface of the conductive wire or in the gap between the adjacent ends of the conductive wire.

3. The coil component according to claim 1, wherein a type of the resin in the magnetic portion and a type of the resin in the first resin portion are different from each other.

4. The coil component according to claim 3, wherein a second resin portion is provided on the second surface of the coil conductor at least either on the surface of the conductive wire or in the gap between the adjacent ends of the conductive wire.

5. The coil component according to claim 3, wherein the conductive wire is wound with a fusing agent in between in the coil conductor, and a type of the fusing agent and the type of the resin in the first resin portion are different from each other.

6. The coil component according to claim 5, wherein a second resin portion is provided on the second surface of the coil conductor at least either on the surface of the conductive wire or in the gap between the adjacent ends of the conductive wire.

7. The coil component according to claim 1, wherein the conductive wire is wound with a fusing agent in between in the coil conductor, and a type of the fusing agent and the type of the resin in the first resin portion are different from each other.

8. The coil component according to claim 7, wherein a second resin portion is provided on the second surface of the coil conductor at least either on the surface of the conductive wire or in the gap between the adjacent ends of the conductive wire.

* * * * *